T. E. Stanley,
Boring Wood.
No. 105,271.  Patented July 12, 1870.
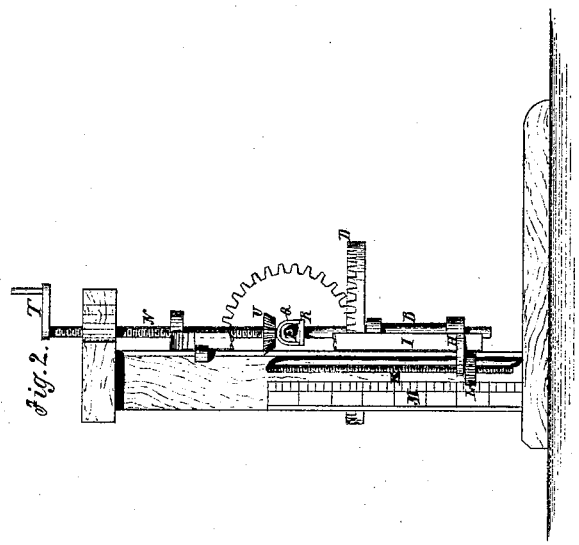
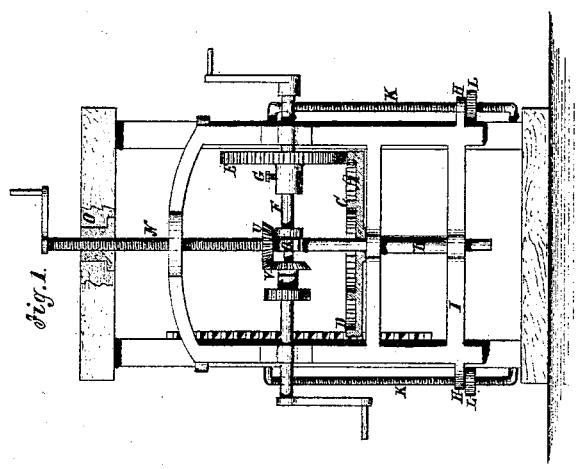
Witnesses:
Inventor:
T. E. Stanley
Per
Attorneys.

United States Patent Office.

THOMAS E. STANLEY, OF HAZLEHURST, MISSISSIPPI.

Letters Patent No. 105,271, dated July 12, 1870.

IMPROVEMENT IN BORING-TOOL.

The Schedule referred to in these Letters Patent and making part of the same.

*To all whom it may concern:*

Be it known that I, THOMAS E. STANLEY, of Hazlehurst, in the county of Copiah and State of Mississippi, have invented a new and improved Boring-Tool; and I do hereby declare that the following is a full, clear, and exact description thereof, which will enable others skilled in the art to make and use the same, reference being had to the accompanying drawing forming part of this specification.

This invention relates to boring-machines, and consists in certain improvements thereon.

Figure 1 represents a front elevation of my improved machine, and

Figure 2 represents a side elevation of the same.

Similar letters of reference indicate corresponding parts.

A is the large horizontal wheel, such as commonly used for driving the vertical spindles or stocks, B, for the auger.

To this wheel I add a second smaller toothed rim, C, (D being the ordinary toothed rim,) and I arrange the driving-wheel, E, on the crank-shaft F, so that it may be readily shifted to gear with one or the other of these rims, for driving the spindle fast or slow, according to the size of the auger, or the nature of the wood to be bored, whether hard or soft, and I provide set-screws, G, or other suitable means for securing it in either position.

H represents projections on the gate or carriage I, supporting the spindle and operating gear.

They are crotched in the ends (or may have holes thereat) for fitting against or around the screws K, permanently fixed to the vertical frame parallel with the line of movement of the carriage.

These screws have adjustable nuts, L, on them under the projections, for arresting the movement of the carriage when the projections come down upon them.

They may be set at any required height to stop the boring at any depth.

Scales, M, may be placed on the posts to indicate the position required for the nuts for holes of any required depth.

The stopping of the carriage in this way admits of continuing the rotation of the auger a sufficient length of time to draw out the chips and clear the holes in a simple and expeditious manner.

N is a pressure feed-screw, screwing down through a nut in the cross-beam O, upon a yoke, Q, springing over the crank-shaft, and bearing on a block, R, swiveled to the top of the auger spindle.

This screw is provided with a hand-crank, T, at the top, and a bevel-wheel, U, at the bottom. The latter gears, when the screw is down upon the yoke, with another bevel-wheel, V, on the crank-shaft, so that, when the crank-shaft is turned, the screw will be turned also, and caused to press the carriage and auger spindle down to insure the feeding in cases where the gimlet points of the augers fail to effect the same.

The pitch of the screw and its speed should be so adjusted, relatively to the speed of the auger spindle and the pitch of the auger, as to cause a continuous and uniform pressure as the operation continues.

Having thus described my invention,

I claim as new and desire to secure by Letters Patent—

The frame I, perforated ears H H, nuts L, threaded bars K, pressure screw N, spindle B, yoke Q, block R, two rimmed wheel A C, adjustable wheel E, and bevel-gears U V, all relatively constructed and arranged on the main frame as set forth.

T. E. STANLEY.

Witnesses:
W. J. WILSON,
S. WICKERT.